United States Patent [19]

Iizuka et al.

[11] Patent Number: 4,787,006

[45] Date of Patent: Nov. 22, 1988

[54] SHUTTER PIN GROOVE FOR A MAGNETIC DISC CARTRIDGE

[75] Inventors: Michio Iizuka, Saku; Haruo Shiba, Komoro, both of Japan

[73] Assignee: TDK Corporation, Tokyo, Japan

[21] Appl. No.: 153,497

[22] Filed: Feb. 3, 1988

Related U.S. Application Data

[63] Continuation of Ser. No. 784,796, Oct. 4, 1985, abandoned.

[30] Foreign Application Priority Data

Oct. 26, 1984 [JP] Japan ................. 59-162426[U]

[51] Int. Cl.$^4$ ............................................ G11B 23/033
[52] U.S. Cl. ........................................ 360/133; 360/99; 206/444
[58] Field of Search ........................... 360/97–99, 360/133, 88; 206/337, 444; 369/291

[56] References Cited

U.S. PATENT DOCUMENTS

| 4,152,739 | 5/1979 | DeMoss et al. | 360/133 |
| 4,497,009 | 1/1985 | Onishi et al. | 360/99 |
| 4,517,617 | 5/1985 | Tsuji et al. | 369/291 |
| 4,589,105 | 5/1986 | Nemoto et al. | 360/133 |
| 4,710,839 | 12/1987 | Iizuka et al. | 360/133 X |

FOREIGN PATENT DOCUMENTS

| 0174111 | 3/1986 | European Pat. Off. | 360/99 |
| 55-42311 | 3/1980 | Japan | 206/387 |
| 59-45780 | 3/1984 | Japan | 360/133 |
| 60-52979 | 3/1985 | Japan | 360/98 |

OTHER PUBLICATIONS

IBM Technical Discl. Bull. vol. 27, No. 1A, Jun. 1984, pp. 40–41 "Shutter Mechanism for Flexible Disk Cartridge" by Carey et al.

Primary Examiner—Stuart N. Hecker
Assistant Examiner—Alfonso Garcia
Attorney, Agent, or Firm—Burgess, Ryan and Wayne

[57] ABSTRACT

A magnetic disc cartridge is composed of a pair of upper and lower case members so as to form a hard case to accommodate a magnetic disc therein. An aperture for access of a read-write head to the magnetic disc extends in a radial direction, which aperture is selectively covered by a shutter. The case has a groove on the peripheral edge thereof to receive a shutter actuation pin. The groove extends across the adjoining surfaces of the two case members. A groove portion defined by the lower case member is more enlarged than the remaining groove portion defined by the upper case member so that the shutter actuation pin does not catch in the step between the two groove portions.

5 Claims, 4 Drawing Sheets

PRIOR ART Fig. 7

SHUTTER PIN GROOVE FOR A MAGNETIC DISC CARTRIDGE

This application is a continuation of application Ser. No. 784,796, filed Oct. 4, 1985 now abandoned.

BACKGROUND OF THE INVENTION

1. Field of the Invention

The present invention is related to a magnetic disc cartridge having a magnetic disc accommodated therein. More particularly, it is related to a hard case structure having a groove for engagement with a shutter actuation pin.

2. Description of the Related Art

The use of a magnetic disc as a memory medium is widely known for a variety of applications, such as a memory unit in an electronic computer. Such a disc is usually accommodated in a casing to enable it to be optionally loaded in a disc drive apparatus or removed therefrom for storage. Two types of casings are available: one, a flexible jacket made of, for example, a vinyl chloride and generally known as a floppy disc; and another, a hard case structure rotatably accommodating the magnetic disc and generally known as a magnetic disc cartridge.

In the known magnetic disc cartridge, the hard case is constituted by a pair of upper and lower hard case members having identical profiles, which are superposed, one on the other, and joined together. The case is provided with an aperture to enable access of a read-write head to the magnetic disc and a shutter to selectively cover the aperture. The shutter is operated by a shutter actuation pin arranged in the disc drive apparatus, which opens the aperture when the cartridge is loaded in the apparatus. The shutter actuation pin finally comes to rest in a groove provided in the peripheral surface of the cartridge case across the adjoining surfaces of the two case members to lock the shutter in the open position. However, a problem can arise in such a magnetic disc cartridge when the cartridge is being loaded in the disc drive apparatus, in that the shutter actuation pin will catch on the case at the adjoining surfaces of the two case members if the two case members were not exactly superposed during assembly of the cartridge, and the shutter actuation pin may then ride on the lower case member projected or displaced from the upper case member and will not be able to attain its correct position, with the result that the pin will exert pressure on the case and cause the cartridge to bend.

SUMMARY OF THE INVENTION

It is an object of the present invention to provide a magnetic disk cartridge which can solve the above-described problem.

According to the present invention, there is provided a magnetic disc cartridge adapted for use with a disc drive apparatus having a housing to receive the cartridge a read-write head, and a shutter actuation pin, the magnetic disc cartridge comprising a magnetic disc, a generally flat case for accommodating the magnetic disc, the case having a center axis and a peripheral edge and a means for defining an aperture in the case between the center axis and the peripheral edge to allow access by the read-write head to the magnetic disc, a shutter movably mounted on the case and engagable with the shutter actuation pin to move between a first position in which the shutter closes the aperture and a second position in which the shutter opens the aperture, and a means for defining a groove on the peripheral edge of the case, the groove extending in parallel to the center axis through the case to receive the shutter actuation pin when the shutter is in the second position, wherein the case comprises a pair of upper and lower case members superposed one on the other, and the groove is formed by a first groove defined on a peripheral edge of the upper case member and a second groove defined on a corresponding peripheral edge of the lower case member, the depth of the second groove being greater than that of the first groove.

BRIEF DESCRIPTION OF THE DRAWINGS

Other features and object of the present invention will become apparent from the following description of the preferred embodiment in reference to the attached drawings, in which:

FIG. 7 is a side view of the cartridge in FIG. 3, with the shutter actuation pin caught at the step between the upper and lower case members.

DESCRIPTION OF THE PREFERRED EMBODIMENT

Figure 1:
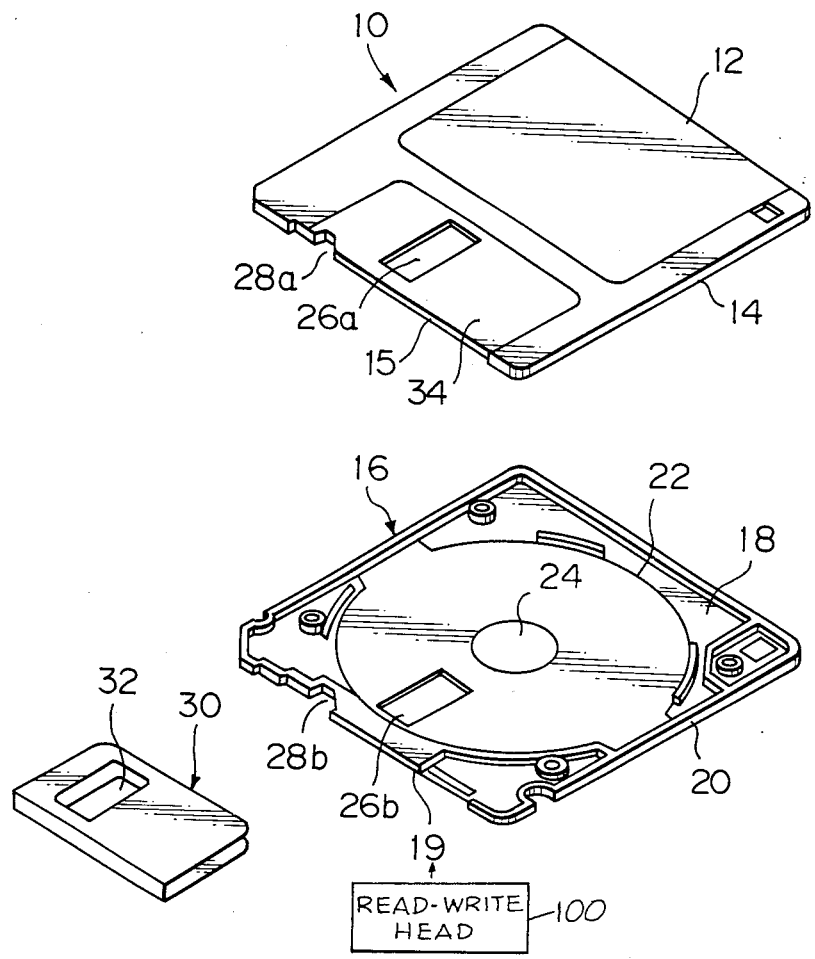
FIG. 1 is an exploded perspective view of a magnetic disc cartridge according to the present invention, with a magnetic disc omitted.
Figure 2:
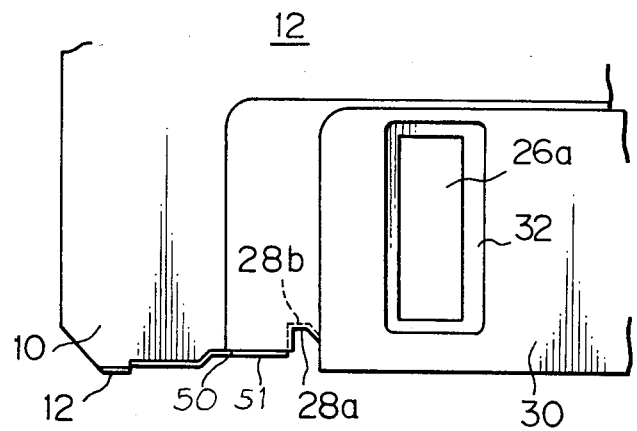
FIG. 2 is a enlarged partial plane view of the cartridge in FIG. 1.

Referring to FIGS. 1 and 2, the magnetic disc cartridge comprises an upper hard case member 10, a lower hard case member 16, a magnetic disc (not shown) between the upper and lower case members 10 and 16, and a shutter 30 slidably mounted on the case. The upper and lower case members 10 and 16 are substantially identical in shape and form a substantially flat square case.

The upper case member 10 has a top flat wall 12 and a peripheral wall 14 projecting downward around the top wall 12. A front portion 15 of the peripheral wall 14 extends substantially straight and is referred to herein as a front peripheral edge. The lower case member 16 also has a bottom flat wall 18 and a peripheral wall 20 projecting upward around the bottom wall 18 with a front peripheral edge 19. As can be seen, the lower case member 16 has a circular area 22 in which the magnetic disc is located, and a similar circular area can be provided in the upper case member 10. The lower case member 16 further has a central hole 24 allowing an external drive shaft of a magnetic disc drive apparatus (not shown) to pass therethrough and rotationally drive the magnetic disc (not shown).

The upper and lower case members 10 and 16 have elongated apertures 26a and 26b extending between the respective peripheral edges 15 and 19 and the center of the members 10 and,16, respectively, to allow access by a read-write head 100 in the magnetic disc drive apparatus to the magnetic disc accommodated in the case. The upper and lower case members 10 and 16 are provided with grooves 28a and 28b on the respective front peripheral edges 15 and 19 thereof, respectively, in such a manner that the grooves 28a and 28b align with each other across the adjoining surfaces of the case members 10 and 16 when these members 10 and 16 are assembled as one unit.

As shown in FIGS. 2, 3 and 4A-4C, front peripheral edges 15 and 19 to the left of grooves 28a and 28b are formed with a recessed front wall portion 50 and 51, respectively, which are contiguous with and lead into grooves 28a and 28b. As a result, the shutter actuation pin 36 rides along front wall portions 50 and 51 and enters groove 28.

The shutter 30 is mounted on the assembled case over sliding surfaces (only an upper sliding surface 34 can be seen in FIG. 1) along the peripheral edges 15 and 19. The top and bottom of the shutter 30 are provided with openings 32, which expose or cover the elongated apertures 26a and 26b. As will be clear, the shutter 30 moves between a first closed position (FIG. 4 (A)) and a second open position (FIG. 4 (C)). The shutter 30 is normally biased toward the closed position by a spring (not shown).

The upper and lower case members 10 and 16 are assembled or superposed one on the other in an abutment relationship of the peripheral walls 14 and 20 by bonding or screwing, with an internal space remaining therebetween to accommodate the magnetic disc therein. The upper and lower case members 10 and 16 also may be provided with means for exactly locating the case members relative to each other so that the outer peripheral surfaces of the resultant case may be smoothly contiguous. Nevertheless, the peripheral surfaces may be displaced from each other during the assembly operation so that the peripheral edge 19 of the lower case member 16 may project from the peripheral edge 15 of the upper case member 10, as seen in FIG. 2.

Figure 5:
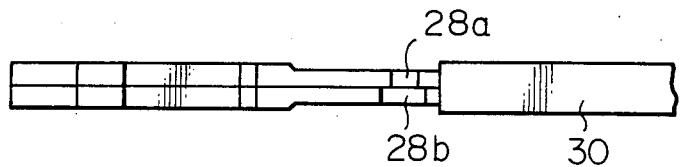
FIG. 5 is a side view of the cartridge in FIG. 2.

Although the outer contours of the upper and lower case members 10 and 16 are substantially identical, the contours of the grooves 28a and 28b are shaped so that the groove 28b of the lower case member 16 is retracted from the groove 28a of the upper case member 28a even if the peripheral edge 19 of the lower case member 16 projects from the corresponding peripheral edge 15 of the upper case member 10. Namely, the depth of the groove 28b of the lower case member 16, as viewed from the peripheral edge 19 to the bottom of the groove 28, is greater than that of the groove 28a of the upper case member 10, when similarly viewed. The width of the groove 28b is also greater than that of the groove 28a, as shown in FIG. 5. This feature according to the present invention should be compared with the prior art arrangement shown in FIG. 3, in which the groove 28b of the lower case member 16 projects from the groove 28a of the upper case member 10 if the peripheral edge 19 of the lower case member 16 projects from the peripheral edge 15 of the upper case member 10

A modern magnetic disc drive apparatus is provided with a housing to receive the magnetic disc cartridge, a read-write head accessible to the magnetic disc in the cartridge, and a shutter actuation pin. The magnetic disc cartridge can be horizontally inserted in the housing, with the peripheral edges 15 and 19 directed to the front side. The shutter actuation pin 36, as shown in FIG. 4, remains stationary in the drive apparatus so that it can engage with the inserted front edge, e.g, the peripheral edges 15 and 19 of the cartridge case and the corner of the shutter 30, which is in the closed position.

Figure 3:
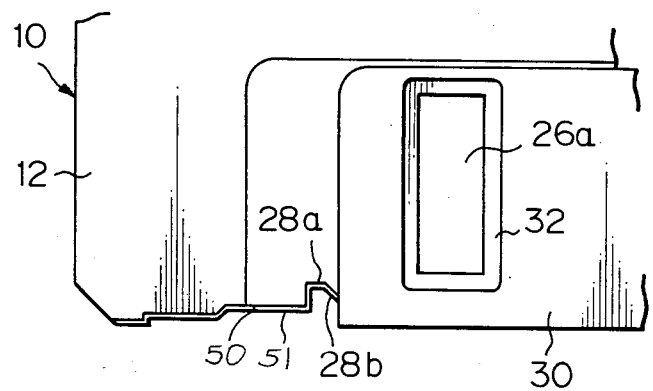
FIG. 3 is a view similar to FIG. 2, but showing a prior art arrangement.
Figure 4A:
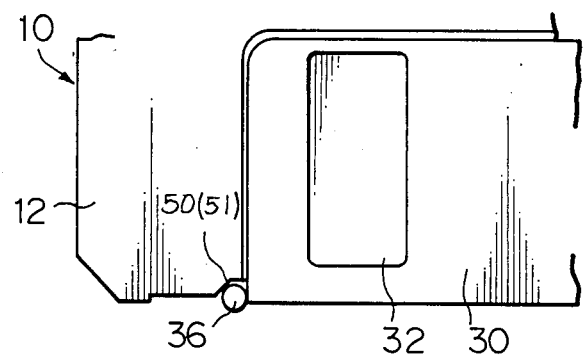
FIG. 4 shows plan views of the cartridge, illustrating the shutter opening process.
Figure 4B:
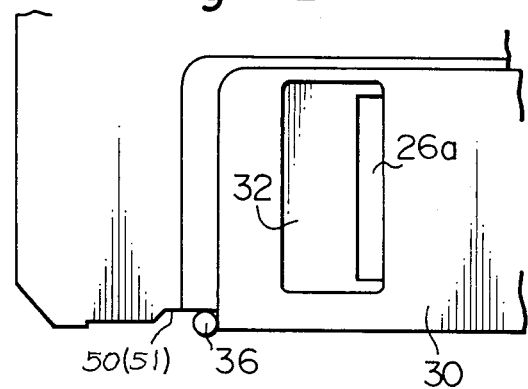
Figure 4C:
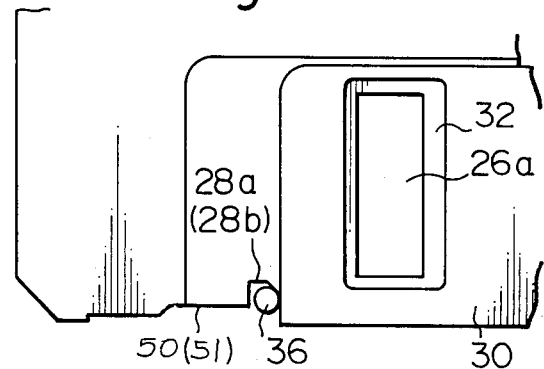
Figure 6:
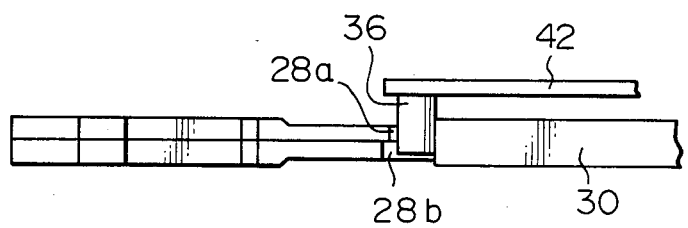
FIG. 6 is a view similar to FIG. 5, with the shutter actuation pin engaged with the groove.
Figure 6:
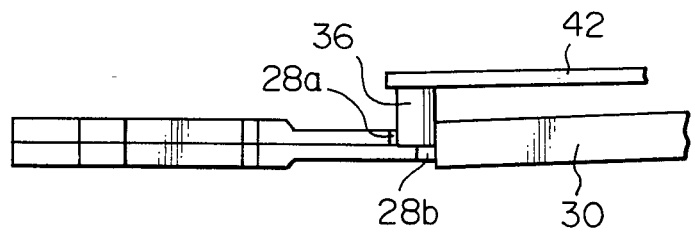

The housing is then horizontally laterally moved together with the cartridge, with the shutter 30 abutted against the stationary shutter actuation pin 36, with the result that a relative movement occurs between the shutter 30 and the case to open the shutter 30. The grooves 28a and 28b then come in front of the shutter actuation pin 36, and further insertion of the cartridge causes the shutter actuation pin 36 to rest in the grooves 28a and 28b. It will be appreciated that the shutter 30 completely opens the aperture 26a (and 26b) by its opening 32 when the grooves 28a and 28b move in front of the shutter actuation pin 36. Then the housing together with the cartridge is dropped vertically in a direction perpendicular to the sheet of FIG. 4, and the shutter actuation pin 36 follows this movement. The operation of the magnetic disc drive apparatus is now ready to start. As previously stated, the problem, in the prior art occurred at that vertical movement of the cartridge and the shutter actuation pin 36. As shown in FIGS. 6 and 7, the shutter actuation pin 36 normally hangs from an arm 42. If the groove 28b of the lower case member 16 projects from the groove 28a of the upper case member 10, as shown in FIGS. 3 and 7, the free bottom edge of the shutter actuation pin 36 may occasionally catch on the step between the grooves 28a and 28b, and further downward force applied to the shutter actuation pin 36 causes the cartridge to bend.

According to the present invention, since the groove 28b of the lower case member 16 is retracted from the groove 28a of the upper case member 10, as shown in FIGS. 2, 5 and 6, the problem of the catching of the shutter actuation pin 36 in the prior art arrangement is solved, and the shutter actuation pin 36 can easily pass across the adjoining surfaces of the grooves 28a and 28b.

We claim:

1. A magnetic disc cartridge comprising, a substantially flat case having a center axis and a front peripheral edge, a magnetic disc rotatably housed in said case and having a center rotational axis which defines the center axis of said case, means for defining an aperture in said case between said center axis and said peripheral edge for access of a read-write head to said magnetic disc, a shutter movably mounted on said case and engageable with a shutter actuation pin to move between a first position in which said shutter closes said aperture and a second position in which said shutter opens said aperture, and a means for defining a groove on said peripheral edge of said case to receive the shutter actuation pin when said shutter is in said second position, wherein said case comprises a pair of upper and lower case members superposed one upon the other and in registry with each other said upper case member includes an upper front peripheral edge and said lower case member includes a lower front peripheral edge in registry with said upper front peripheral edge, said upper front peripheral edge includes an upper recessed straight edge portion and said lower front peripheral edge includes a lower recessed straight edge portion, and said means for defining a groove is formed by a first groove portion defined on a portion of the upper front peripheral edge of said upper case member and contiguous with the upper recessed straight edge portion, and a second groove portion defined on a portion of the lower front peripheral edge of said lower case member and contiguous with the lower recessed straight edge portion, said second groove having a greater depth from said upper front peripheral edge than that of said first groove from said lower front peripheral edge when said upper and lower front peripheral edges are in registry with each other, whereby the shutter acuation pin moves along said upper and lower recessed straight edge portions and then falls into said groove and is thereby able to attain a correct positioning in the groove and will not exert pressure on the lower case member thereat, which would otherwise cause bending of the cartridge.

2. A magnetic disc cartridge according to claim 1, wherein said portions of said upper and lower front peripheral edges extend substantially straight and said shutter is slidably mounted on said case along said substantially straight upper and lower front peripheral edge portions.

3. A magnetic disc cartridge according to claim 2, wherein said shutter is biased toward said first position in a direction generally along said portions of said upper and lower front peripheral edges and the shutter actuation pin causes said shutter to be moved toward said second position against said spring in a direction generally along said portions of said upper and lower front peripheral edges.

4. A magnetic disc cartridge according to claim 3, wherein the shutter actuation pin slides against said upper and lower front peripheral edges to actuate said shutter between said first and second positions, and the shutter actuation pin rests in said groove when said shutter reaches said second position.

5. A magnetic disc cartridge according to claim 1, wherein the width of said second groove is greater than that of said first groove in a direction and along the substantially straight portions of the upper and lower front peripheral edges.

* * * * *